United States Patent [19]
Goff et al.

[11] Patent Number: 5,405,537
[45] Date of Patent: Apr. 11, 1995

[54] PROCESS FOR COMBUSTING DEWATERED SLUDGE WASTE IN A MUNICIPAL SOLID WASTE INCINERATOR

[75] Inventors: Stephen P. Goff, Orefield; Diane M. DeVincentis, Schnecksville; Shoou-I Wang, Allentown; Donald P. Bucci, Mertztown; Frank J. Romano, Kutztown; Goutam H. Shahani; Matthew J. Foder, both of Allentown, all of Pa.

[73] Assignee: Air Products and Chemicals, Inc., Allentown, Pa.

[21] Appl. No.: 38,731

[22] Filed: Mar. 26, 1993

[51] Int. Cl.6 .......................... B01D 1/30; F23G 5/04
[52] U.S. Cl. ........................ 210/739; 110/188; 110/221; 110/238; 110/346; 210/770
[58] Field of Search ............... 210/739, 738, 769, 770, 210/774; 110/188, 346, 221, 238; 122/2; 241/25, 33, DIG. 38

[56] References Cited

U.S. PATENT DOCUMENTS

| | | | |
|---|---|---|---|
| 2,292,572 | 8/1942 | Komline | 239/223 |
| 3,622,508 | 11/1971 | Komline | 210/758 |
| 4,516,511 | 5/1985 | Kuo | 122/2 |
| 4,753,181 | 6/1988 | Sosnowski | 110/346 |
| 5,123,364 | 6/1992 | Gitman et al. | 110/188 |

FOREIGN PATENT DOCUMENTS 1350060 4/1974 United Kingdom ............... 110/238

Primary Examiner—Joseph W. Drodge
Attorney, Agent, or Firm—Thomas G. Ryder

[57] ABSTRACT

This invention relates to an improved process for the coincineration of municipal solid waste and municipal sewage sludge by dewatering the sludge, breaking it up into sufficiently small particles and employing oxygen enrichment of the combustion process. These small particles of sludge are introduced into the combustion zone above the grate in the combustion zone but at a distance above the grate no higher than that of the point of introduction of secondary air. This is accomplished without undesired excursions of flue gas flow rate and temperature.

10 Claims, 2 Drawing Sheets

PROCESS FOR COMBUSTING DEWATERED SLUDGE WASTE IN A MUNICIPAL SOLID WASTE INCINERATOR

FIELD OF THE INVENTION

This invention relates to an improved process for the combustion of sludge waste in a municipal solid waste incinerator. More particularly, this invention relates to a process wherein the sludge is dewatered and the dewatered sludge is divided into fine particles. The process also comprises introducing the sludge at a particular point in the combustion zone and enriching the combustion air with oxygen.

BACKGROUND OF THE INVENTION

Sewage sludge is a byproduct of wastewater treatment, either primary or secondary. The disposal of sewage sludge from wastewater treatment plants is a growing environmental problem throughout the world, especially in the United States, Europe and Japan. In many areas of the world the dumping of sludge into the ocean has recently been banned, such as, for example, western Europe and the United States. Generally, there is a pressing need for economical and environmentally safe methods for disposing of sewage sludge.

Present methods for disposal of sewage sludge include landfilling, land application, composting and pelletization for making fertilizers, incineration, and wet oxidation. Land application, composting, and pelletization, which attempt to utilize the sludge as a fertilizer, have quality requirements on such things as the heavy metals content in the sludge. If these limitations are exceeded, disposal options are normally limited to landfilling, incineration, and wet oxidation. In highly industrial areas such as the northeastern United States, southeastern Canada, western Europe and Japan, a compounding of factors further aggravates the sludge disposal problem. In these areas sludge volumes tend to be the highest, sludge quality is often poor (high heavy metals), and landfill space is scarce.

Another waste with disposal challenges similar to sewage sludge is municipal solid waste (MSW). Although the physical properties of sewage sludge and MSW are very different, their elemental compositions on a dry basis are very similar, with primary components of carbon, hydrogen, oxygen, and ash. The major difference between sewage sludge and MSW is in their moisture contents. MSW generally contains about 20 to 30 wt. % moisture. Raw sewage sludge from wastewater treatment is essentially a liquid slurry, and normally contains only 2 to 4 wt. % solids in water. To reduce the weight and volume for disposal, wastewater treatment plants often dewater the sludge to between 15 and 30 wt. % solids by mechanical means. Mechanical dewatering causes a drastic change in the physical properties of sewage sludge, converting it from a liquid slurry to a moist solid, with a consistency similar to wet dirt or mud.

The primary method of MSW disposal in the United States is landfilling. However, incineration of MSW does account for more than 15% of MSW disposal, and the MSW incinerators tend to be located in the more populated urban areas. Coincineration of sewage sludge with municipal solid waste is an alternative to sludge incineration that eliminates the need to build a stand alone incinerator. While this is advantageous, the high moisture content and low net heating value of dewatered sewage sludge have a significant detrimental effect on the combustion conditions in the MSW incinerator. Specifically, the addition of sewage sludge results in decreased combustion temperature and increased flue gas flow rate relative to the combustion of MSW alone. In addition, the physical properties of dewatered sewage sludge make it difficult to dry and combust in a typical moving grate MSW incinerator. The sludge often exits the incinerator dried and seared on the outside surface, but still moist and unburned on the inside.

Accordingly, a need exists for a process to coincinerate a significant quantity of dewatered sewage sludge, or other high moisture sludge material, in an MSW incinerator, without changing the combustion conditions of the incinerator from operation without sludge, and while maintaining a low unburned carbon content in the ash.

It has previously been suggested to coincinerate sewage sludge with MSW and attempts have been made to coincinerate raw sludge, dewatered sludge and thermally dried sludge. Many of such suggested techniques have proven to be impracticable or less than what might be desired.

Raw sewage sludge from a wastewater treatment plant normally contains 2 to 4 wt. % solids. Additional thickening equipment can increase the solids content possibly as high as 8 wt. % solids. The thickened sludge, however, still has the physical properties of a flowable liquid slurry.

Utilization of spray techniques to inject thickened sludge (typically 5-8 wt. % solids) directly into the combustion chamber of a solid waste incinerator was investigated in the 1970s. Limited trials with 3.5 wt. % solid sludge and a dual fluid spray nozzle were conducted to atomize sludge for coincineration into a full-scale refuse incinerator located in Havant, United Kingdom. The sludge to MSW ratio was limited in the tests to 3 wt. %. Full scale installation of the sludge atomization feed system at Havant was abandoned.

U.S. Pat. No. 3,322,079 describes a method and apparatus for incinerating sewage sludge and municipal waste. In this patent, the apparatus described is comprised of an incinerator housing with a traveling or conveying grate for solid waste fuel. A device, such as a centrifugal atomizer, is used to feed sludge into the combustion gases above the bed of burning solid waste. The atomizer is installed in a drying chamber, an extension of the combustion chamber, that requires a hot gas recirculating blower to contribute to the centrifugal dispersion of sludge particles, and also to heat the sludge to ignition temperature. The patent states that it is desirable to operate at a sludge feed rate, MSW feed rate, and combustion air flow such that the exhaust gas from the combustion chamber is maintained at 1400° F. Without oxygen enrichment, however, the sludge/MSW ratio must be limited to impracticably low levels.

As explained above, dewatered sludge is obtained by mechanical processing (such as a belt press, filter press, or centrifuge), and normally contains between 15 and 30 wt. % solids. Attempts to coincinerate dewatered sludge with MSW have been limited to very low ratios of sludge relative to MSW. Dewatered sludge feed methods have included premixing the sludge and MSW in the MSW storage pit, dropping the sludge into the MSW feed chute, and spreading the sludge directly on the burning bed of trash via elaborate mechanical means. These operations are plagued by three major problems:

1. Unburned sludge material remaining in the bottom ash, caused by failing adequately to mix the sludge or break it into small enough particles;
2. Low sludge capacity relative to MSW (2-3 wt. % on a dry sludge basis) due to decreasing combustion temperature and increasing flue gas flowrate with dewatered sludge addition.
3. Unacceptably high concentrations of carbon monoxide in the flue gas due to lower temperatures in the combustion zone.

The present invention solves the above problems to enable the successful coincineration of mechanically dewatered sewage sludge, containing from 15 to 30 wt. % solids, with MSW in high ratios, for example, 10 wt. %, or more (e.g., 15% or even greater), sludge (dry basis) to MSW. In theory the upper limits on sludge flowrate and solids content are not limited by the sludge atomization nozzle or oxygen-enriched coincineration process, but by the sludge feed system. A single dual-fluid nozzle should be able to feed dewatered sludges as high as 25 to 30 wt. % solids. Since multiple nozzles could be used, the upper limit on sludge to MSW will be set by other constraints that will vary with the incinerator design, such as flue gas dew point (which increases due the moisture in the sludge), or oxygen compatibility of the combustion air ducts which will limit the level of oxygen enrichment.

To reduce the moisture content below that which mechanical dewatering can achieve requires thermal drying of the sludge. This can be accomplished in either direct or indirect contact equipment, such as, for example, heat recovery from the combustion flue gas. Thermally dried sludge can contain from 60 to 90+ wt. % solids. Thermal drying also causes significant physical changes to the sludge, producing a very dry, powdery product that ignites and burns easily.

To coincinerate successfully a significant fraction of sewage sludge relative to MSW using previously suggested technologies requires the sludge to be thermally dried.

Since dried sewage sludge has a net lower heating value equal to or greater than MSW, heat is released in the combustion of the sewage sludge solids. Further, the combustion of additional waste material does increase flue gas and combustion air flow rates relative to operation with MSW alone, which must be accounted for in a new design and decreases MSW capacity in a retrofit.

Another previous suggestion includes U.S. Pat. No. 4,630,555, which describes a cyclic process for incinerating waste which uses pure oxygen along with liquid (water) injection for temperature control. The waste is charged to the furnace in batches, and the oxygen and liquid are injected through a nozzle. The flowrates of oxygen and the liquid change throughout each cycle to first initiate combustion and then control combustion temperature.

Still another suggestion is described in U.S. Pat. No. 4,056,068 relating to a process to spray water into the flue gas of a waste incinerator above the secondary air nozzles to accelerate catalytically CO oxidation of unburned material in the combustion gases.

Yet another suggestion is shown in U.S. Pat. No. 5,147,563 which reveals a process and apparatus for aerobic treatment of sewage sludge. In this process an oxygen-rich or ozone-rich gas is injected with sludge into a dispersing assembly to atomize and oxygenate the sludge.

More recently, U.S. Pat. No. 5,052,310 entitled "Solid Waste-to-Steam Incinerator Capacity Enhancement by Combined Oxygen Enrichment and Liquid Quench," assigned to Air Products and Chemicals, Inc., describes a process to dispose of a high moisture containing waste (such as sewage sludge) in a MSW incinerator by enriching the combustion air with oxygen. This patented process employs the synergistic combination of oxygen enrichment with the high moisture content in the waste, which enables the coincineration of large quantities of the wet waste in an existing MSW incinerator without changing the combustion temperature, excess oxygen in the flue gas, and flue gas flowrate. This patented process also is sufficiently broad so as to encompass the utilization of just water (i.e., 100% moisture, 0% solids).

The present invention addresses issues such as the means or manner for introducing sewage sludge, or other similar high moisture material having a BTU or fuel value, into an MSW incinerator to ensure that it dries and burns completely within the limitations of that system (grate design, furnace residence time, temperature, etc.) and which combustion air streams should be enriched to optimize the combustion process on the basis of carbon burnout in the ash and gaseous emissions of CO and $NO_x$.

SUMMARY OF THE INVENTION

The present invention relates to an improvement in a process for the co-incineration of a solid waste (e.g., MSW) and a relative high moisture content material having a significant solid particulate content and fuel value (e.g., sewage sludge) in an incineration system comprising a combustion zone containing a grate on which the solid waste is combusted, means for introducing the solid waste onto the grate, means for introducing combustion supporting air into the combustion zone and means for introducing the high moisture content material into the combustion zone. The means for introducing combustion supporting air into the combustion zone includes primary air inlet means for introducing combustion supporting air at a point beneath the grate and secondary air inlet means for introducing combustion supporting air at a point above the grate. The process comprises combusting the solid waste on the grate, introducing combustion supporting air to the combustion zone and combusting the high moisture content material in the combustion zone.

The particular improvement of this invention comprises adjusting the solids content of the high moisture content material to the range from about 15 to about 30 per cent by weight, finely dividing the high moisture content material to particles smaller than about 1000 microns, introducing the high moisture content material into the combustion zone at a point above the solid waste on the grate, but no higher than the point at which the secondary air is introduced into the combustion zone, and enriching at least a portion of the combustion supporting air with oxygen to an oxygen concentration of at least about 21 per cent by volume.

Preferably, the high moisture content material, such as dewatered sewage sludge, is reduced to particle sizes which average less than about 500 microns and advantageously the particle sizes are less than about 250 microns or smaller.

The amount of enrichment oxygen added to the combustion zone is usually at least about 0.5 pounds of oxygen per pound of dry solids contained in the high moisture content material and, preferably, is at least about 3.5 pounds of oxygen per pound of dry solids contained in the high moisture content material. Conversely, the amount of enrichment oxygen added to the combustion zone is usually no more than about 8 pounds of oxygen per pound of dry solids contained in the high moisture content material and, preferably, is no more than about 5.5 pounds of oxygen per pound of dry solids contained in the high moisture content material.

In the practice of this invention, the solid particulate matter in the high moisture content material can be finely divided by any means known to the art, such as by mechanical means prior to introduction into the combustion zone. It is preferred, however, that the high moisture content material be finely divided by introducing the high moisture content material into the combustion zone by means of a dual-fluid atomizer which utilizes a secondary atomizing medium; whereby the solid particulate matter is broken up.

DESCRIPTION OF THE DRAWINGS

FIG. 1 shows an incineration system comprising a combustion zone 10 which contains a series of rollers 12 which together constitute a roller grate apparatus 14 on which solid waste material as shown by Ref. 16 can be combusted. A waste material such as municipal solid waste, is introduced (from a source not shown) into hopper 18 from whence it flows downwardly to ram feeder 20. The municipal solid waste 16 is then pushed by ram feeder 20 out onto the higher end of the roller grate apparatus 14. In a manner well known in the art, each of the rollers 12 is rotated in a manner so that the municipal solid waste is mixed, agitated, and moved to the lower end of roller grate apparatus 14 while being combusted as it moves across the surface of the roller grate apparatus 14.

Figure 1:
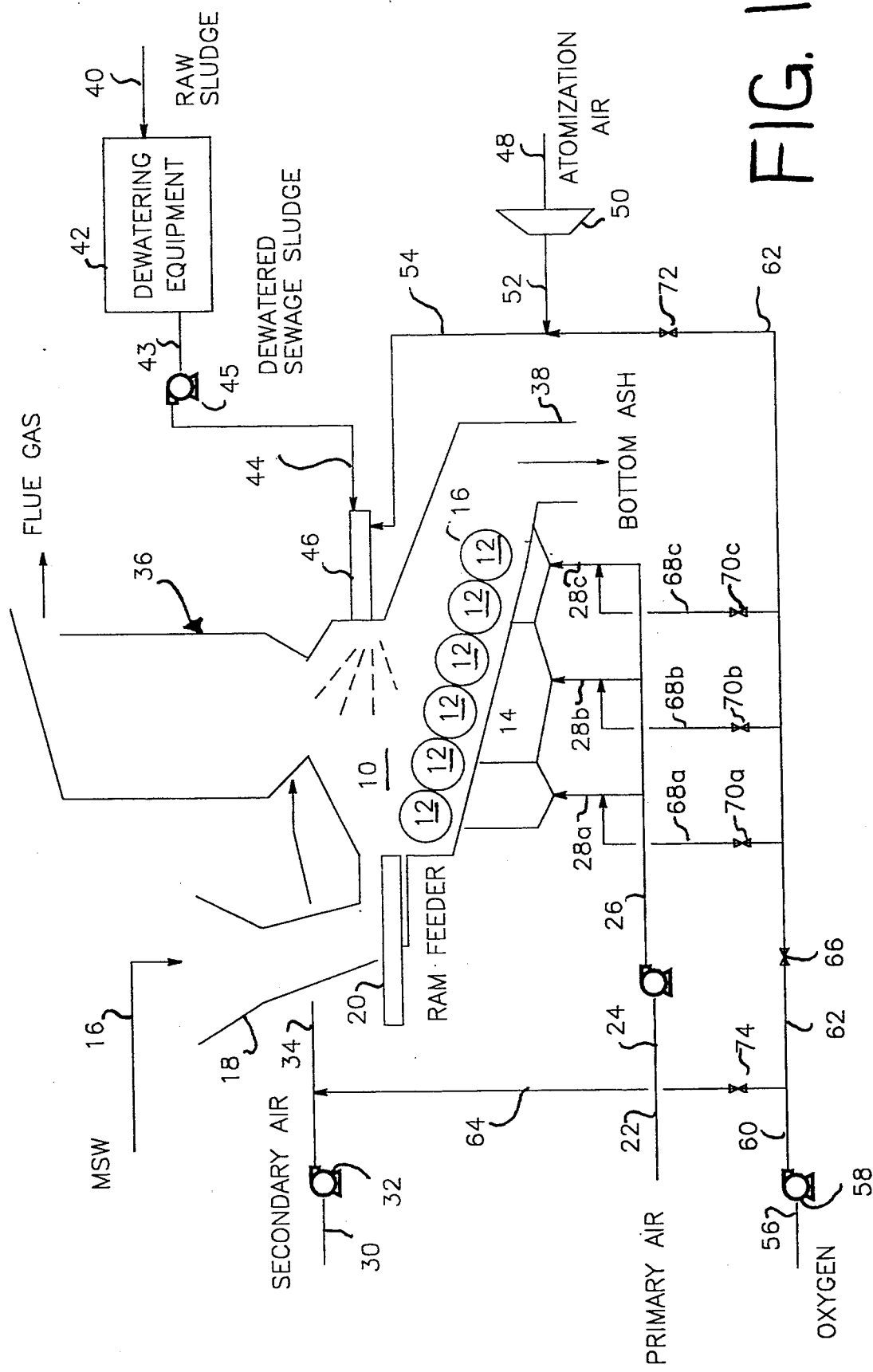
FIG. 1 is a schematic representation of an incineration system which includes the present invention.

Primary air is drawn into the system through line 22 by means of blower fan 24 which delivers the primary air at the desired rate into manifold line 26. The primary air in manifold line 26 is then separately delivered to three different areas under the roller grate apparatus as shown by lines 28a, 28b and 28c.

Secondary air is drawn into the system through line 30 by means of blower fan 32 and is delivered at the desired rate by means of line 34 to a point in the combustion zone well above the roller grate apparatus 14.

The gaseous combustion products are removed from the combustion zone 10 by means of heat recovery and flue system 36. The ash remaining from the combustion of the municipal solid waste 16 falls from the lower end of roller grate apparatus 14 and passes by means of gravity through conduit 38 to an ash pit (not shown).

The improvements of the present invention are illustrated in this figure where sewage sludge is passed by means of line 40 to a mechanical dewatering means 42 wherein the sludge is dewatered so as to increase its solids content from a level of less than about 5% (typical of most municipal sewage sludges) up to a level in the range from about 15% to about 30% by weight solids. Any of the well known types of mechanical dewatering apparatus (such as, filter presses, belt presses, centrifuges) are suitable for use in this invention. The dewatered sewage sludge is then removed from dewatering device 42 by means of line 43 and then pumped by means of pump 45 and delivered to dual fluid atomizer 46 (or an equivalent device capable of breaking up the sludge into particles of less than 1000 microns, preferably less than about 500 microns) via conduit 44.

Also shown in FIG. 1 is atomization air inlet line 48 by which air is drawn into compressor 50 where it is compressed to the desired pressure and flow rate and then passed by means of lines 52 and 54 to dual fluid atomizer 46. The compressed atomization air introduced into the dual fluid atomizer 46 by means of line 54 functions to break up and finely divide the dewatered sewage sludge introduced into dual fluid atomizer 46 by means of conduit 44. As shown in FIG. 1, the finely divided sewage sludge is introduced from dual fluid atomizer 46 into combustion zone 10 at a point above the roller grate apparatus 14 but below the level at which secondary air is introduced into combustion zone 10 by means of line 34.

Also illustrated in FIG. 1 is the capability of employing oxygen enrichment in this incineration system. Thus, oxygen (from a source not shown) is introduced into the system through oxygen inlet line 56 by means of fan 58. The oxygen from fan 58 is passed by means of line 60 to valved lines 62 and 64 as shown in FIG. 1. Valved line 62 is provided with a valve 66 downstream of which three separate valved lines 68a, 68b and 68c interconnect line 66 with lines 28a, 28b, and 28c, respectively. Valved lines 68a, 68b and 68c are also provided with valves 70a, 70b and 70c, respectively.

As further shown in FIG. 1, oxygen line 62 also connects with line 54 at a point downstream of its connection with line 68c. The portion of line 62 between the connection with line 68c and its connection with line 54 is provided with another valve 72.

FIG. 1 also shows that valved line 64 which interconnects oxygen line 60 with secondary air line 34 contains valve 74.

Through the operation of the various valves described in the oxygen distribution network, it is possible to provide oxygen enrichment to the primary air, the secondary air and/or the atomization air utilized in the incineration system. Thus, for example, by closing valve 74, opening valves 66, 70a, 70b and 70c, while closing valve 72, it is possible to provide oxygen enrichment only to the primary air delivered to all three areas under the roller grate apparatus 14. In such conformation, it is also possible to alter the oxygen concentration going to the three areas under the roller grate apparatus 14 by altering the settings of valves 70a, 70b and 70c.

In another mode, it is possible to provide oxygen enrichment to the secondary air only by means of opening valve 74, while closing valve 66.

It is also possible to provide oxygen enrichment only to the atomization air and the dual fluid atomizer by means of closing valves 74, 70a, 70b and 70c, while leaving valves 66 and 72 open. It is also possible to provide oxygen enrichment to the primary air, secondary air and atomization air by opening valves 66, 70a, 70b, 70c, 72 and 74. By adjusting the setting of each of these valves, one can also separately control the oxygen enrichment to each of the streams.

We prefer to operate the system in a mode wherein substantial oxygen enrichment is provided to the atomization air going to dual fluid atomizer 46. This would require opening valves 66 and 72, while the setting of the valves 70a, 70b, 70c and 74 could be varied, including a mode of operation wherein valves 70a, 70b, 70c and 74 are completely closed.

Figure 2:
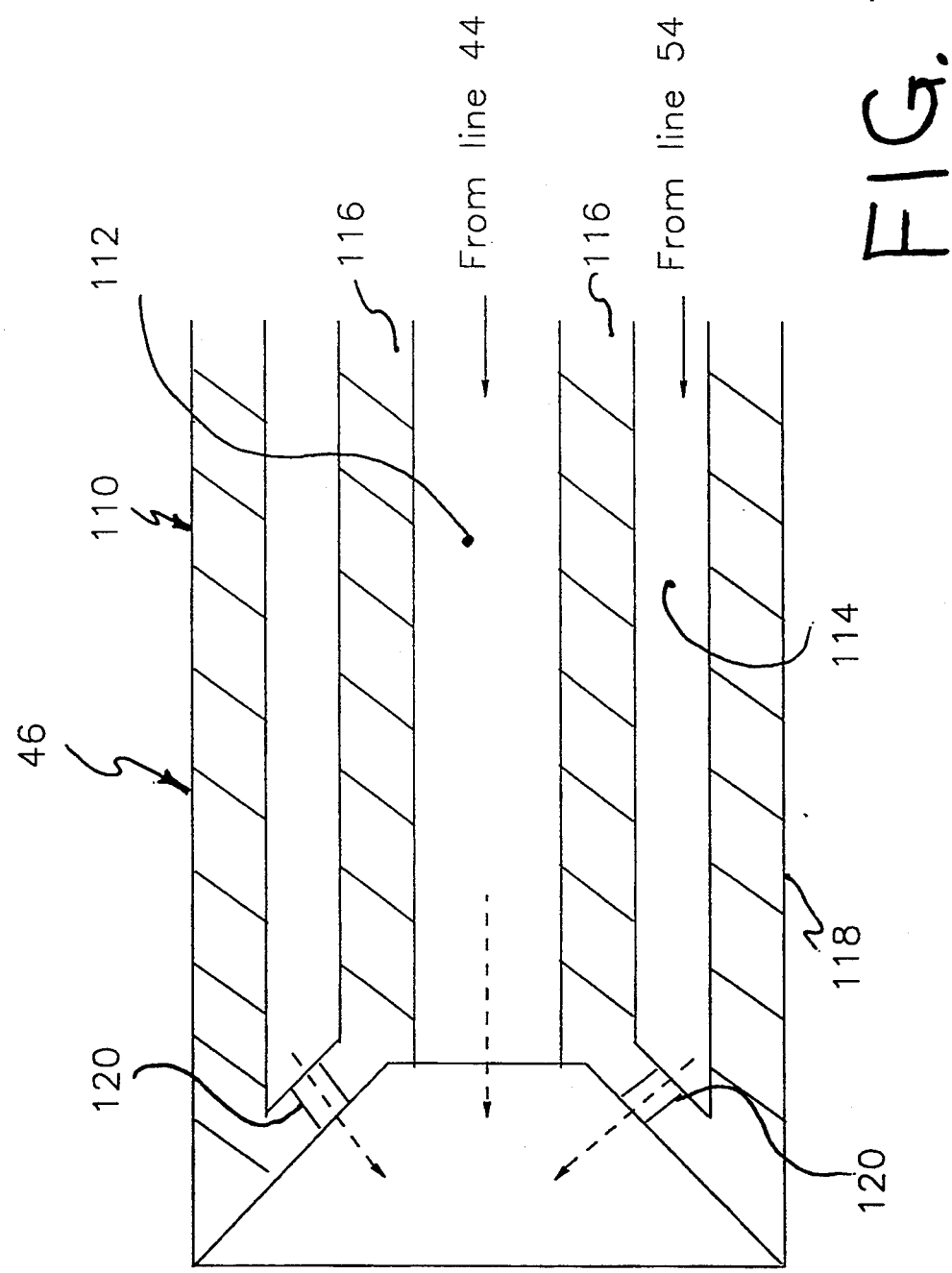
FIG. 2 is a schematic representation of a dual-fluid atomizer used for introducing sludge into a combustion zone.

Referring now to FIG. 2, there is shown a cross-sectional view of dual fluid atomizer 46. Generally, this device consists of a generally cylindrical member 110 having a central inner passageway 112 of generally circular cross-section through which the dewatered sewage sludge of line 44 in FIG. 1 flows. There is also an outer passageway 114 of generally annular cross section defined between generally annular inner wall 116 and the outer wall 118 of cylindrically member 110. The atomizing gas of line 54 in FIG. 1, either air, oxygen or, preferably oxygen-enriched air, flows through this outer passageway 114.

As shown in FIG. 2, the outer annular passageway 114 terminates at the exit end of dual fluid atomizer 46 in a series of exit ports 120 disposed at an acute angle to the axis of cylindrical member 110 so as to cause the atomizing gas flowing through the outer passageway 114 and through ports 120 to impinge upon the dewatered sludge exiting from inner passageway 112. The direction of flow of the dewatered sludge from inner passageway 112 and the atomizing gas from ports 120 is indicated by arrows in FIG. 2. It is through this action of the atomizing gas impinging upon the exiting dewatered sludge that the solids in the sludge are broken up into finely divided particles. It will be understood that the extent of atomization and solids break-up can be adjusted by adjusting the pressure, velocity and angle of the atomization gas exiting from ports 120. For example, we have found that employing an angle of about 45 degrees between the axis of cylindrical member 110 and ports 120 and employing an atomizing gas pressure exit pressure in the range from about 50 to about 80 psig, preferably about 60 to about 70 psig, is quite effective to break up the dewatered sludge into particles of less than about 1000 microns and usually less than about 500 microns. It is particularly preferred to break up the dewatered sludge into particles smaller than about 250 or even 100 microns. It will be understood that the smaller the particle the better, but the above limits are quite satisfactory.

DETAILED DESCRIPTION OF THE INVENTION

In a pilot unit conforming essentially to the apparatus described in FIG. 1 and having a nominal capacity of six tons per day of MSW, a series of runs were conducted to demonstrate the operation of this invention.

EXAMPLE 1

In this example a series of runs was conducted using several different mechanical devices, such as extrusion plates with holes ranging from 0.125 to 0.5 inch, to introduce sludge into the combustion zone, and mixing sludge with the MSW before charging to the combustion zone. These attempts at coincineration resulted in the production of externally seared pieces of sludge with moist, unburned interiors. Many of these unburned sludge pieces contained upwards of 30% unburned carbon. Additionally, the odor of unburned sludge was detected in the bottom ash.

A rotary atomizer, in which the sludge is pushed out of holes on the perimeter of a disk rotating at a high speed causing the sludge to be sheared into small particles, is satisfactory to divide the sludge into particles smaller than about 1000 microns. We prefer to use a dual fluid nozzle of the type illustrated in FIG. 2, wherein the sludge exiting the center conduit is impacted on all sides by high velocity gas jets, which tear the sludge into tiny particles smaller than 1000 microns, usually smaller than an average of about 250 microns. Although substantially any pressurized gas, including nitrogen, steam, methane, air, oxygen-enriched air or pure oxygen, can be used in the dual fluid nozzle, we prefer to employ oxygen-enriched air. When air or oxygen is used as the atomization fluid, it serves the dual purpose of providing a portion of the combustion air to the incineration process and providing the energy for atomizing the dewatered sewage sludge. In the subsequent Examples, a dual fluid atomizer was employed using either air or oxygen as the atomizing gas at a pressure of 65 psig.

EXAMPLE 2

In this example a series of runs was conducted. In one run, only MSW was charged to the combustion zone. No sewage sludge was added and no oxygen enrichment was practiced. This run serves as a "baseline" for comparison with the runs illustrating this invention. Two other runs were conducted utilizing a dual fluid atomizer to break up dewatered sewage sludge into particles having an average size of less than about 250 microns and to introduce this small particle size sludge into the combustion zone at a point above the grate apparatus, but at a point no higher than the point at which the secondary air was introduced into the combustion zone. Air at a pressure of about 60 psig was employed as the atomizing fluid. In these two runs, the secondary combustion air was enriched with oxygen. The operating parameters for these runs are shown in Table 1, below. In this example and the subsequent examples the flue gas exit temperature was normalized to an excess oxygen level of 8.5%.

TABLE 1

| Run No. | | Baseline | 17B | 25B |
|---|---|---|---|---|
| MSW | pph | 539–668 | 525 | 752 |
| Sludge | pph | 0 | 170 | 370 |
| Oxygen | pph | 0 | 100 | 272 |
| dry Sludge/MSW | wt % | — | 4.5 | 7.2 |
| Oxygen/dry Sludge | wt % | — | 4.2 | 5.0 |
| Flue Gas NOx (@ 7% O2) | ppm | 8.12 | 8.59 | 7.57 |
| Bottom Ash Carbon | wt % | <0.5 | 0.68 | <0.1 |
| Fly Ash Carbon | wt % | <2.0 | 2.06 | 0.7 |
| Furnace Exit Temperature @ 8.5% O2 | F | 1535 | 1524 | 1547 |
| Grate Temperature | F | 407 | 587 | 673 |

From the above data it can be seen that the present invention is capable of combusting substantial quantities of sewage sludge with varying degrees of oxygen enrichment, while controlling the flue gas exit temperature and flue gas flow rates comparable to that existing in the baseline case. The effectiveness of the combustion can be seen by the bottom ash and fly ash carbon contents.

EXAMPLE 3

In this Example, a series of runs was conducted utilizing a dual fluid atomizer to break up dewatered sludge into particles averaging less than about 100 microns and to introduce it into the combustion zone at a point above the grate apparatus, but at a point no higher than, and preferably lower than, the point at which the secondary air was introduced into the combustion zone. Air at a pressure of about 65 psig was employed as the atomizing gas in the dual fluid atomizer. Oxygen enrichment of the secondary air was also practiced. The range of MSW charge rate, sludge addition rate and oxygen enrichment for this series of runs, along with average values for flue gas analyses, temperatures and flow rates are shown in Table 2, below. For comparison purposes, the data for the baseline case of Example 2 is also shown in Table 2.

TABLE 2

| Run No. | | Baseline | 16A, 16B, 17B |
|---|---|---|---|
| MSW | pph | 539–668 | 525–582 |
| Sludge | pph | — | 130–170 |
| Oxygen | pph | — | 100–133 |
| dry Sludge/MSW | wt % | — | 3.8–4.5 |
| Oxyen/dry Sludge | wt % | — | 4.2–6.6 |
| Flue Gas CO (@ 7% O2) | ppm | 152 | 235 |
| Flue Gas NOx (@ 7% O2) | ppm | 251 | 246 |
| Bottom Ash Carbon | wt % | <0.5 | 0.68 |
| Fly Ash Carbon | wt % | <2.0 | 2.06 |
| Flue Gas Flow | | 8.27 | 8.37 |
| Furnace Exit Temperature @ 8.5% O2 | F | 1508 | 1525 |
| Grate Temperature | F | 437 | 612 |

The above data demonstrate that the present invention is capable of controlling the $NO_x$ concentration of the flue gas while combusting substantial quantities of dewatered sludge. While there is some increase in the CO content of the flue gas, such is still within acceptable limits.

EXAMPLE 4

In this Example, another series of "baseline" runs was conducted utilizing the MSW available at a different time than the MSW used in the runs of Examples 2 and 3. Again no sewage sludge was added to the baseline runs, nor was oxygen enrichment practiced. Another series of runs illustrating this invention was also conducted in which a dual fluid atomizer was employed to break up dewatered sewage sludge and to introduce it into the combustion zone at a point above the grate apparatus, but below the point at which the secondary air was introduced into the combustion zone. Air at a pressure of about 65 psig was employed as the atomizing gas in dual fluid atomizer. Oxygen enrichment of the secondary air was practiced in this series of runs. The data for these runs is shown below in Table 3.

TABLE 3

| Run No. | | Baseline | 23B, 23C, 24B |
|---|---|---|---|
| MSW | pph | 575–649 | 583–697 |
| Sludge | pph | 0 | 370 |
| Oxygen | pph | 0 | 171–302 |
| dry Sludge/MSW | wt % | — | 8.2–9.5 |
| Oxygen/dry Sludge | wt % | — | 3.1–5.4 |
| Flue Gas CO (@ 7% O2) | ppm | 104 | 67 |
| Flue Gas NOx (@ 7% O2) | ppm | 211 | 278 |
| Furnace Exit Temperature @ 8.5% O2 | F | 1563 | 1506 |
| Flue Gas @ 8.5% O2/MSW | lb/lb | 8.26 | 9.07 |

From the data in Table 3 it will be seen that the process of this invention can be operated in a manner that maintains the flue gas temperature and flow rate close to that obtained in the baseline case, while effecting a substantial reduction in the CO content of the flue gas. This is indicative of more efficient and more complete combustion being effected in the system.

EXAMPLE 5

In this Example, another run was conducted utilizing the dual fluid atomizer to break up and to introduce dewatered sludge into the combustion zone at a point above the grate apparatus, but below the point of secondary air introduction. In this run oxygen enrichment was practiced by enhancing the oxygen content of the secondary air. This also constituted the oxygen enrichment of the overall system. The data for this run is shown below in Table 4, along with data from the baseline of Example 4.

TABLE 4

| Run No. | | Baseline | 24C |
|---|---|---|---|
| MSW | pph | 575–649 | 591 |
| Sludge | pph | 0 | 490 |
| Oxygen | pph | 0 | 272 |
| dry Sludge/MSW | wt % | — | 11.0 |
| Oxygen/dry Sludge | wt % | — | 4.2 |
| Flue Gas CO (@ 7% O2) | ppm | 104 | 136 |
| Flue Gas NOx (@ 7% O2) | ppm | 211 | 278 |
| Furnace Exit Temperature @ 8.5% O2 | F | 1563 | 1592 |
| Flue Gas @ 8.5% O2/MSW | lb/lb | 8.26 | 9.3 |

It will be noted that more than 10% dewatered sludge (on a dry basis) was added to the combustion zone and the temperature and flow rate of the flue gas were kept at substantially the same level as obtained in the baseline case.

EXAMPLE 6

In this example, another series of runs was conducted to illustrate the effects of introducing dewatered sludge to the combustion zone in the absence of oxygen enrichment. Again the dewatered sludge was broken up into particles averaging less than about 150 microns and introduced into the combustion zone by means of a dual fluid atomizer. No oxygen enrichment was practiced. The data from these runs is compared with the data from the baseline case of Example 4 and shown in Table 5, below.

TABLE 5

| Run No. | | Baseline | 22B, 26B |
|---|---|---|---|
| MSW | pph | 575–649 | 552–616 |
| Sludge | pph | 0 | 235–370 |
| Oxygen | pph | 0 | 0 |
| dry Sludge/MSW | wt % | — | 5.1–11.3 |
| Oxygen/dry Sludge | wt % | — | — |
| Bottom Ash Carbon | | <0.3 | 0.3 |
| Fly Ash Carbon | | <1.0 | 1.2 |
| Furnace Exit Temperature @ 8.5% O2 | F | 1563 | 1304 |
| Flue Gas @ 8.5% O2/MSW | lb/lb | 8.26 | 10.35 |

It will be clearly seen that there was a significant reduction in the flue gas temperature which could result in undesirable production of CO and dioxins. Further, there was a relatively large increase in the flue gas flow as shown by the FG/MSW ratio.

From the above data it can also be seen that the practice of this invention permits the incineration of dewatered sewage sludge, typically containing between 15 and 30 wt. % solids, in the combustion zone of an MSW incinerator, while maintaining the design combustion conditions in the furnace, i.e. the combustion temperature, flue gas excess oxygen content, and flue gas flowrate, substantially unchanged from those encountered when incinerating MSW alone. Further, it can be seen that the process of this invention is capable of incinerating dewatered sewage sludge containing between about 13 and about 17 wt. % solids. The demonstrated ratios of sludge to MSW ranged from about 3.8 to about 11.0% on a dry sludge basis. During these runs the combustion efficiency remained substantially equivalent to the baseline operation, as measured by the flue gas CO concentrations and bottom/fly ash carbon contents.

EXAMPLE 7

In this example MSW is incinerated in a system as illustrated in FIG. 1 with dewatered sewage sludge being introduced at a point above the grate but below the point of secondary air introduction. No oxygen enrichment of the primary or secondary air is utilized and only oxygen enrichment of the atomization air is practiced. The oxygen enrichment is controlled so as to maintain an oxygen concentration at a level of less than about 70% by volume. In various situations the oxygen concentration can be held to concentrations of less than about 60%, and even less than about 40%. The introduction of the oxygen in the atomizing gas is effective to enhance the combustion of the sludge by providing an oxygen enriched atmosphere at the point that the sludge is introduced into the combustion zone. This technique is capable of maintaining the furnace flue gas flow rate, carbon monoxide concentrations and overall furnace combustion conditions at design conditions of the furnace for the incineration of only MSW.

We claim:

1. In a process for the co-incineration of a solid waste and sewage sludge containing solid particulate matter in an incineration system comprising a combustion zone containing a grate on which the solid waste is combusted, means for introducing the solid waste onto the grate, means for introducing a flow of combustion supporting air into the combustion zone including primary air inlet means for introducing combustion supporting air at a point beneath the grate and secondary air inlet means for introducing combustion supporting air at a point above the grate, and means for introducing sewage sludge into the combustion zone, which process comprises combusting the solid waste on the grate, introducing combustion supporting air, and combusting the sewage sludge in the combustion zone, the improvement which comprises:
 a) dewatering the sludge to a solids content from in the range of about 15 to about 30 percent by weight;
 b) finely dividing the solid particulate matter in the dewatered sludge to particles smaller than about 1000 microns;
 c) introducing the dewatered sludge into the combustion zone at a point above the solid waste on the grate and not above the point at which the secondary air is introduced to the combustion zone; and
 d) enriching at least a portion of the flow of combustion supporting air with oxygen to an oxygen concentration of at least about 21 percent by volume.

2. The process of claim 1 wherein the amount of enriching oxygen added to the combustion zone is in the range of from about 0.5 to about 8 pounds of oxygen per pounds of dry solids contained in the dewatered sludge.

3. The process of claim 2 wherein the amount of enriching oxygen added to the combination zone is in the range of from about 3.5 to about 5.5 pounds of oxygen per pound of dry solids contained in the dewatered sludge.

4. The process of claim 1 wherein the particulate matter in the sludge is finely divided by introducing the sludge into the combustion zone by means of a dual-fluid atomizer which utilizes a secondary fluid atomizing medium.

5. The process of claim 4 wherein the atomizing medium is gas.

6. The process of claim 5 wherein the atomizing medium is air.

7. The process of claim 6 wherein the atomizing medium is oxygen enriched air.

8. The process of claim 1 wherein the solid particulate matter in the sludge is divided into particles smaller than about 500 microns.

9. The process of claim 1 wherein CO in gas exiting the combustion zone is measured and the quantity of enrichment oxygen added is controlled so as to maintain the CO at a predetermined level.

10. The process of claim 1 wherein the flow rate of flue gas exiting the combustion zone is measured and the quantity of enrichment oxygen added is controlled so as to maintain the flue gas flow rate at a predetermined level.

* * * * *